United States Patent
Mock-Knoblauch et al.

(10) Patent No.: US 8,022,134 B2
(45) Date of Patent: Sep. 20, 2011

(54) MODIFIED POLYAMINOAMIDES

(75) Inventors: Cordula Mock-Knoblauch, Ludwigshafen (DE); Juergen Detering, Limburgerhof (DE); Dieter Boeckh, Limburgerhof (DE); Parmod Kakumanu Reddy, West Chester, OH (US); Xinbei None Song, Cincinnati, OH (US)

(73) Assignee: BASF Aktiengesellschaft, Ludwigshafen (DE)

( * ) Notice: Subject to any disclaimer, the term of this patent is extended or adjusted under 35 U.S.C. 154(b) by 1283 days.

(21) Appl. No.: 10/592,370

(22) PCT Filed: Mar. 18, 2005

(86) PCT No.: PCT/EP2005/002918
§ 371 (c)(1),
(2), (4) Date: Sep. 11, 2006

(87) PCT Pub. No.: WO2005/090442
PCT Pub. Date: Sep. 29, 2005

(65) Prior Publication Data
US 2007/0179270 A1    Aug. 2, 2007

Related U.S. Application Data

(60) Provisional application No. 60/554,360, filed on Mar. 19, 2004.

(51) Int. Cl.
*C08G 73/02* (2006.01)
*C11D 3/37* (2006.01)

(52) U.S. Cl. ......... 524/538; 525/418; 525/420; 525/430

(58) Field of Classification Search ............. 525/418, 525/420, 430; 524/538
See application file for complete search history.

(56) References Cited

U.S. PATENT DOCUMENTS

| 4,664,848 A | 5/1987 | Oh et al. | |
| 2005/0032667 A1* | 2/2005 | Norenberg et al. | ........... 510/480 |

FOREIGN PATENT DOCUMENTS

| EP | 1 025 839 | 8/2000 |
| EP | 1 192 941 | 4/2002 |
| GB | 1218 394 | 1/1971 |
| WO | 98 29530 | 7/1998 |
| WO | 03 050219 | 6/2003 |

OTHER PUBLICATIONS

Showel, Michael S., "Powdered Detergents", Surfactant Sci. Ser., vol. 71, pp. 1-19, 1998.
Kuo-Yann Lai, "Heavy-Duty Liquid Detergents", Surfactant Sci. Ser., vol. 67, pp. 261-324, 1997.

* cited by examiner

*Primary Examiner* — Ana L Woodward
(74) *Attorney, Agent, or Firm* — Oblon, Spivak, McClelland, Maier & Neustadt, L.L.P.

(57) ABSTRACT

The present invention relates to novel modified polyaminoamides which are useful as dispersing agents for particulate inorganic solids, especially for inorganic pigments such as clay minerals. The new polyamides are also useful as graying inhibiting additives and detergency boosting additives in washing composition for laundry. In the modified polyaminoamide according to the invention at least a part of the amino nitrogens of the polymer carry both a hydrocarbon radical R which is selected from $C_1$-$C_6$-alkyl, $C_6$-$C_{16}$-aryl-$C_1$-$C_4$-alkyl and a group Alk-O-A, wherein A is hydrogen or an acidic group selected from $B^1$—PO(OH)$_2$, $B^1$—S(O)$_2$OH and $B^2$—COOH which may be present in the acidic or anionic form, wherein $B^1$ is a single bond or C1-$C_6$-alkanediyl, and $B^2$ is $C_1$-$C_6$-alkanediyl and Alk is $C_2$-$C_6$-alkane-1,2-diyl, and a moiety of the formula (I) —$(CH_2$—$CR^1R^2$—O—$)_p$A , wherein A is as defined above $R^1$ is independently selected from hydrogen, $C_1$-$C_{12}$-alkyl, $C_2$-$C_8$-alkenyl, $C_6$-$C_{16}$-aryl or $C_6$-$C_{16}$-aryl-$C_1$-$C_4$-alkyl, $R^2$ is independently selected from hydrogen or methyl and p is an integer provided that p has a number average of at least 10.

22 Claims, No Drawings

MODIFIED POLYAMINOAMIDES

The present invention relates to novel modified polyaminoamides which are useful as dispersing agents for particulate inorganic solids, especially for inorganic pigments such as clay minerals. The new polyamides are also useful as graying inhibiting additives and detergency boosting additives in washing compositions for laundry.

Washing of textile in aqueous wash liquor is a complex process involving the cooperative interaction of numerous physical and chemical influences. A fundamental distinction exists between the primary step, in which soil is removed from a substrate (primary detergency), and secondary stabilization in the wash liquor of dispersed or molecularly dissolved soil (second detergency). If a less than optimal detergent formulation is employed, some or all of the soil may at some point return to the fibers (redeposition). This is termed a wash liquor showing "insufficient soil anti-redeposition capability". After repeated washing the problem becomes especially apparent as a distinct graying of the laundry, which scarcely can be reversed.

Certain polymers are known to be useful for preventing the redeposition of soil by stabilizing the soil in the wash liquor. Amongst these are carboxymethylcellulose (CMC), huminic acid, polyacrylic acid and copolymers of maleic acid and acrylic acid (see Powdered Detergents, Editor: Michael S. Showell, Surfactant Sci. Ser., Vol. 71, Marcel Decker, New York 1998, pages 111-114; Liquid Detergents, Editor, Kuo-Yann Lai, Surfactant Sci. Ser., Vol. 67, Marcel Decker, New York 1997, page 303). However, their action with regard to particulate soil, such as organic and especially inorganic, pigments, such as oxides, carbonates and silicates, in particular clay minerals, is poor. Moreover their anti-redeposition capability decreases with increasing water hardness. Also, anionic surfactants may impair their activity.

Polyaminoamides are known to be polymers whose backbone chain contains both amino functionalities (NH) and amide functionalities (NH—C(O)). Modified polyaminoamides containing polyether side chains, which are attached to the amino nitrogen atoms of the polymer backbone and, if present, to the amino nitrogen atoms of the end-groups of the polymer, are known e.g. from GB 1218394, EP 1025839, EP 1192941 and WO03/050219. In the modified polyaminoamides of prior art the number average of the repeating units in the polyether side chain is in most cases from 1 to 6. Up to now, polyaminoamides have neither been suggested as anti-redeposition agents nor to be useful for assisting in soil removal.

Consequently, there is ongoing need for compounds which are useful as detergent auxiliaries for preventing redeposition of soil and for assisting in soil removal. It is therefore an object of the present invention to provide compounds which have good soil removal properties and good dispersing properties for particulate soil, especially for organic and inorganic pigments, in particular for clay minerals. These properties should be maintained even in hard water and in the presence of interfering substances such as anionic surfactants. Moreover, these compounds should be readily incorporated into both solid and liquid laundry detergent formulations and should not impair their stability.

These objects are surprisingly achieved by modified polyaminoamides, wherein at least a part of the amino nitrogens of the polymer backbone and, if present, of the amino end groups carry both a radical R as defined below and a polyether moiety of the formula I as defined below.

Therefore, the invention relates to a modified polyaminoamide, wherein at least a part of the amino nitrogens of the polymer carry both a radical R which is selected from $C_1$-$C_6$-alkyl, $C_6$-$C_{16}$-aryl-$C_1$-$C_4$-alkyl and a group Alk-O-A, wherein
A is hydrogen or an acidic group selected from $B^1$—PO$(OH)_2$, $B^1$—S(O)$_2$OH and $B^2$—COOH, which may be present in the acidic or anionic form, wherein $B^1$ is a single bond or $C_1$-$C_6$-alkanediyl and $B^2$ is $C_1$-$C_6$-alkanediyl, and
Alk is $C_2$-$C_6$-alkane-1,2-diyl,
and a moiety of the formula I

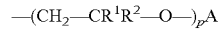

$$—(CH_2—CR^1R^2—O—)_p A \qquad I$$

wherein
A is as defined above
$R^1$ is independently selected from hydrogen, $C_1$-$C_{12}$-alkyl, $C_2$-$C_8$-alkenyl, $C_6$-$C_{16}$-aryl or $C_6$-$Cl_6$-aryl-$C_1$-$C_4$-alkyl,
$R^2$ is independently selected from hydrogen or methyl and
p is an integer provided that p has a number average of at least 10.

The term "$C_1$-$C_{12}$-alkyl" as used herein refers to a saturated straight-chain or branched hydrocarbon radical having 1 to 12, preferably from 1 to 6 carbon atoms, for example methyl, ethyl, propyl, 1-methylethyl, butyl, 1-methylpropyl, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, isooctyl, 2-ethylhexyl, n-nonyl, 2-nonyl (=isononyl), n-decyl or n-dodecyl.

The term "$C_2$-$C_{12}$-alkenyl" as used herein refers to a straight-chain or branched monounsaturated hydrocarbon radical having 2 to 12, preferably from 2 to 6 and especially from 2 to 4 carbon atoms and a double bond in any position, i.e., for example ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl etc.

The term "$C_6$-$C_{16}$-aryl" as used herein refers to an aromatic hydrocarbon radical having from 6 to 16 carbon atom such as phenyl or naphthyl which may carry 1, 2, 3 or 4 substituents selected from $C_1$-$C_{12}$-alkyl and $C_2$-$C_{12}$-alkenyl, wherein 2 substituents on adjacent carbon atoms may form a ring such as in tetrahydronaphthyl or in indanyl.

The term "$C_6$-$C_{16}$-aryl-$C_1$-$C_4$-alkyl" as used herein refers to a saturated straight-chain or branched hydrocarbon radical having 1 to 4 carbon atoms, which carries a $C_6$-$C_{16}$-aryl group. Examples are benzyl, 1-phenylethyl and 2-phenylethyl.

The term $C_1$-$C_6$-alkanediyl and the term $C_2$-$C_6$-alkanediyl refer to a bivalent alkylene chain having from 1 to 6 carbon atoms or 2 to 6 carbon atoms, respectively. Examples of alkandiyl are methylen ($CH_2$), ethane-1,1-diyl, ethane-1,2-diyl, propane-1,1-diyl, propane-1,2-diyl, propane-2,2-diyl, butane-1,3-diyl, butane-1,4-diyl, butane-2,2-diyl, butane-2,3-diyl, etc.

In general, polyaminoamides are polymers whose backbone chain contains both amine functionalities (*—NH—*) and amide functionalities (*—NH—C(O)—*); the asterisks indicate the polymer backbone. Polyaminoamides also contain primary amino-groups ($NH_2$) and/or carboxyl groups (COOH) at the termini of the polymer chain. Here and in the following the term amino comprises both the secondary amine functionalities of the polymer backbone and the primary amine functionalities at the termini of the polymer chain. In general polyaminoamides are linear, however, they can also be branched, linear polyaminoamides being preferred.

In the modified polyaminoamides of the present invention at least a part of the amino groups, i.e. the amino groups in the polymer backbone are replaced by quaternized functionalities of the formula (a)

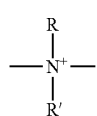
(a)

wherein R is as defined above and R' is a side chain of the formula I. If present, the terminal amino groups of the modified polyaminoamide according to the invention may also be replaced by groups of the formula b1 and b2

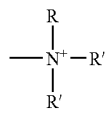
(b1)

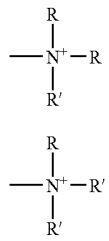
(b2)

wherein R is as defined above and R' is a side chain of the formula I.

In the side chains of formula I, $R^1$ and $R^2$ may be the same or may be different in different repeating units. In other words, the side chains formula I comprise both uniform oligomeric side chains, wherein in each repeating unit $R^1$ and $R^2$ are the same, and cooligomeric side chains, i.e. side chains, wherein $R^1$ and $R^2$ in different repeating units may be different. The different repeating units may be arranged within the side chain randomly or block-wise, such as in

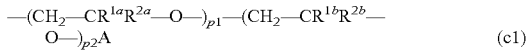
(c1)

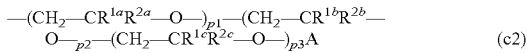
(c2)

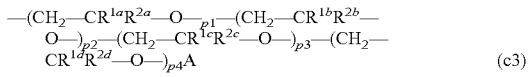
(c3)

wherein each of the radicals $R^{1a}$, $R^{2a}$, $R^{1b}$, $R^{2b}$, $R^{1c}$, $R^{2bc}$, $R^{1d}$ and $R^{2d}$ have the meanings given for $R^1$ and $R^2$ of formula, and have the same meaning within each block p1, p2, p3 and p4, respectively, and the sum of number averages of the integers p1, p2, p3 and p4, i.e. p1+p2+p3+p4, is p of formula I and A in formulae (c1), (c2) and (c3) is as defined for formula I.

With regard to the pigment dispersing properties of the modified polyaminoamides of the invention the number average of p in formula I is preferably at least 15 and more preferably at least 21. Usually the number average of p does not exceed 200, preferably 150 and more preferred 100. Most preferably the number average of p ranges from 15 to 70, especially from 21 to 50. The number average of p equals the molar amount of oxirane III employed in step i) of the inventive process, based on the molar amount of hydrogen atoms bound to the nitrogen atoms of the primary and secondary amino groups in the non-modified polyaminoamide starting material. Herein after the hydrogen atoms, which are bound to the secondary amino groups of the polymer backbone and, if present, to the to the primary amino groups at the termini of the non-modified polyaminoamide starting material, are also referred to as amino (bound) hydrogens in order to distinguish them from the hydrogens bound to the amide nitrogens in the polymer backbone.

In formula I the radical $R^1$ is preferably hydrogen or methyl. $R^2$ is preferably hydrogen. More preferably in at least 30%, especially in at least 50% of the repeating units $CH_2$—$CR^1R^2$—O of the side chains I both radicals $R^1$ and $R^2$ are hydrogen. In a preferred embodiment of the invention the side chains I comprise at least 90% repeating units of the formula $CH_2$—$CH_2$—O, i.e. both radicals $R^1$ and $R^2$ are hydrogen. In another preferred embodiment the side chains I comprise from 10 to 70%, especially from 10 to 50% repeating units of the formula $CH_2$—$CH(CH_3)$—O and from 30 to 90%, especially from 50 to 90% of repeating units $CH_2$—$CH_2$—O. In this embodiment the different repeating units may be arranged randomly or preferably blockwise.

In the modified polyaminoamide of the invention at least a part of the amino nitrogen atoms of the polymer carry both a radical R and a side chain of the formula I, i.e. the amino groups of the starting material are replaced by quaternized functionalities of the formulae (a), (b1) and (b2):as described above. Preferably at least 50%, more preferably at least 70% of the amino groups in the polymer carry both a radical R and. a side chain of the formula I. Preferably the amount of quaternized moieties (a), (b1) and (b2) in the polyaminoamides of the invention is from 0.1 mol/kg to 3.0mol/kg and preferably from 0.2 mol/kg to 2 mol/kg. The amount of the quaternized moieties can be calculated from the difference of the amine number in the non-quaternized product and the quaternized polyaminoamide. The amine number can be determined according to the method described in DGF standard methods—section H—surfactants, method H-III 20a (98) "Potentiometric titration of the total basic nitrogen I surfactants" (DGF Einheitsmethoden—Abteilung H—Tenside, Methode H-III 20a (98) "Potentiometrische Titration des Gesamtbasenstickstoffs von Tensiden").

In a first embodiment of the invention, the radical R is $C_1$-$C_6$-alkyl or benzyl and preferably methyl, ethyl or benzyl. In another embodiment of the invention the radical R is a group Alk-O-A as defined above, with preference given to ethane-1,2-diyl and propane-1,2-diyl.

In a preferred embodiment of the invention, at least 25 molar % and especially at least 50 molar % of the polyether side chains of formula I and, if present, of the groups Alk-O-A carry an acidic/anionic group A, i.e. A is different from hydrogen. In particular, the acidic group is selected from $B^1$—PO$(OH)_2$ and $B^1$—$S(O)_2OH$, wherein $B^1$ is as defined above and especially a single bond. In another embodiment of the invention the acidic group is $B^2$—COOH and especially $CH_2$—COOH.

In the modified polyaminoamides of the invention, wherein A is an acidic group, the acidic group A may be present in the neutralized (anionic) form or in the acidic (i.e. the neutral) form. The net charge of the modified polyaminoamide will therefore depend on the relative molar amounts of acidic groups A to quaternized moieties (a), (b1) and (b2), on the number of charges per acidic group A and on the degree of neutralization of the acidic groups A. The counter ions, which are required to compensate the net-charge of the polyaminoamide, are usually derived from mineral acids in case the net-charge is positive. Suitable counter ions derived from mineral acids are sulfate, hydrogensulfate, monoalkyl-sulfate, such as methylsulfate, phosphate, hydrogenphosphate, halogenide, such as chloride, and the like. If the net-charge is negative, suitable counter ions are e.g. alkaline metal ions, such as sodium, ammonium ions, such as $NH_4^+$, ammonium ions derived from mono-, di- and tri-$C_2$-$C_4$-hydroxyalkylamines or from $C_1$-$C_6$-alkyl-di-$C_2$-$C_4$-hydroxyalkylamines, such as ethanol amine, diethanol amine, triethanol amine, methyl diethanol amine and the like.

The modified polyaminoamides according to the invention have, depending on their degree of alkoxylation, number average molecular weight Mn 1,000 to 1,000,000, preferably from 2,000 to 1,000,000 and more preferably from 2,000 to 50,000.

Quaternized functionalities of the formula (a), (b1),and (b2) can be obtained by
i) reacting the non-modified polyaminoamide with at least 10 moles, per mol of amino bound hydrogens in the non-modified polyaminoamide, of at least one oxirane of the formula III

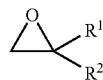

(III)

wherein $R^1$ and $R^2$ are as defined above;
whereby a neutral modified polyaminoamide is obtained, wherein at least a part of the amino nitrogen atoms carry a side chain of the formula I with A being hydrogen;
ii) reacting the modified polyaminoamide of step i) with at least one alkylating compound, which is selected from the compounds of the formula R—X, wherein R is as defined above and X is a leaving group, which is capable of being replaced by nitrogen, and $C_2$-$C_6$-alkylene oxides, especially ethylene oxide or propylene oxide.

Thereby a modified cationic polyaminoamide according to the invention is obtained, wherein A in formula I and, if present, in the groups Alk-O-A are hydrogen. The groups Alk-OA with A=H stem from the reaction of the modified polyaminoamide with a $C_2$-$C_6$-alkylene oxide.

In order to obtain the polyaminoamides of the invention, wherein at least a part of the radicals A are acidic groups, the thus obtainable cationically modified polyaminoamide is esterified with sulfuric acid or phosphoric acid or with an ester-forming derivative thereof, which is capable to react with a hydroxyl group (step iii, alternative 1). Thereby the terminal hydroxyl groups of the side chains of formula I and, if present, of the groups Alk-O—H in the cationically modified polyaminoamide of step ii) are converted into the acidic functionalities A of the formulae $SO_3H$ or $PO(OH)_2$.

However, it is also possible to etherify the hydroxyl groups in the cationically modified polyaminamide obtained in step ii) with a compound of the formula L-$B^3$-A', wherein A' is selected from COOH, $SO_3H$ and $PO(OH)_2$, $B^3$ is $C_1$-$C_6$-alkandiyl and L is a leaving group which can be replaced by nucleophiles (alternative 2). This method is especially useful for the introduction of acidic groups of the formula $B^2$—COOH. Suitable leaving groups are well known to a skilled person and especially they are selected from halogen, especially chlorine or bromine. Preferably the leaving group is bound to the carbon atom adjacent to the acidic functionality such as in chloroacetic acid or bromoacetic acid.

The invention therefore also provides a process for preparing the modified polyaminoamide, which comprises:
i) reacting the non-modified polyaminoamide with at least 10 moles, per mol of amino hydrogens in the non-modified polyaminoamide, of at least one oxirane of the formula III, whereby a modified polyaminoamide is obtained, wherein at least a part of the amino groups carry a side chain of formula I with A being hydrogen;
ii) reacting the modified polyaminoamide of step i) with at least one alkylating compound, which is selected from the compounds of the formula R—X, wherein R is as defined above and X is a leaving group, which is capable of being replaced by nitrogen, and from $C_2$-$C_6$-alkylene oxides, thereby obtaining a cationically modified polyaminoamide; and
iii) optionally esterifying the hydroxyl groups in the cationically modified polyaminamide obtained in step ii) with sulfuric acid or phosphoric acid or with an ester-forming derivative thereof or
etherification of the hydroxyl groups in the cationically modified polyaminamide obtained in step ii) with a compound of the formula L-$B^3$-A', wherein A' is selected from COOH, $SO_3H$ and $PO(OH)_2$, $B^3$ is $C_1$-$C_6$-alkandiyl and L is a leaving group, which can be replaced by nucleophiles.

The invention relates also to the modified polyaminoamides, which are obtainable by this process.

The non-modified polyaminoamide, which is used as a starting material in the process of the invention is usually a condensate of a dicarboxylic acid of formula IV with a polyalkylenpolyamine of formula V and optionally with an aliphatic, aromatic or cycloaliphatic diamine of formula VI.

Dicarboxylic acids of formula IV can be described by the following formula IV $$HOOC-R^4-COOH \qquad (IV)$$

wherein $R^4$ is a chemical bond or a bivalent organic radical which is derived from the dicarboxylic acid. Suitable biovalent radicals $R^4$ comprise from 1 to 20 carbon atoms, from 0 to 6 heteroatoms selected from 0, 5 and N, wherein the heteroatoms may be part of a chain or ring or may be present as a hydroxyl group. Examples are $C_1$-$C_{20}$-alkanediyl which is optionally interrupted by 1, 2 or 3 heteroatoms selected from O, S and an imino group and which may contain 1 or 2 C=C-double bonds, and which may, completely or partially, be a constituent of one or more saturated or unsaturated carbocyclic 5- to 8-membered rings, where the alkanediyl may carry one or more, e.g. 1 to 6 hydroxyl groups. Preferably $R^4$ is $C_2$-$C_8$-alkanediyl and especially $C_2$-$C_6$-alkanediyl, such as ethane-1,2-diyl, propane-1,3-diyl, butane-1,4-diyl, pentane-1,5-diyl, hexane-1,6-diyl, 2,2-dimethylpropane-1,3-diyl and the like.

Suitable dicarboxylic acids are, in particular, those with 2 to 10 carbon atoms, such as oxalic acid, malonic acid, succinic acid, tartaric acid, maleic acid, itaconic acid, glutaric acid, adipic acid, suberic acid, sebacic acid, phthalic acid and terephthalic acid. Also suitable are dibasic amino acids, such as iminodiacetic acid, aspartic acid and glutamic acid. Preferred acids are adipic acid; glutaric acid, aspartic acid and iminodiacetic acid. The dicarboxylic acids can of course be used in a mixture with one another. In an especially preferred embodiment of the invention the dicarboxylic acid is adipic acid or a mixture of dicarboxylic acids comprising at least 50% by weight of adipic acid.

Polyalkylenepolyamines V are to be understood as meaning compounds which consist of a saturated hydrocarbon chain with terminal amino functions which is interrupted by at least one secondary amino group (=imino group). Suitable polyalkylenepolyamines can be described by the general formula

$$H_2N-R^3-(NH-R^3)_n-NH_2 \quad (V)$$

In general n is an integer from 1 to 500, preferably form 1 to 100, more preferred from 1 to 20 or 1 to 10 and especially 1, 2 or 3. $R^3$ is $C_2$-$C_8$-alkanediyl, preferably $C_2$-$C_6$-alkanediyl and more preferred 1,2-ethanediyl or 1,3-propanediyl.

Suitable polyalkylenepolyamines V include diethylenetriamine, triethylenetetramine, tetraethylenpentamine, pentaethylenehexamine, diaminopropylethylenediamine (=N,N'-bis(3-aminopropyl)-1,2-diaminoethane), ethylenepropylenetriamine, 3-(2-aminoethyl)aminopropylamine, dipropylenetriamine, bis(hexamethylene)triamine and polyethyleneimines with molar masses of, preferably, 300 to 20 000, in particular from 300 to 5 000. Preference is given to poly-$C_2$-$C_3$-alkyleneamines with 3 to 10 nitrogen atoms. Of these, particular preference is given to diethylentriamine, 3-(2-aminoethyl)aminopropylamine, dipropylenetriamine and diaminopropylethylenediamine. The polyalkylenepolyamines can of course be used in a mixture with one another.

Suitable aliphatic, aromatic or cycloaliphatic diamines of formula VI can be described by the following formula $$NH_2-R^7-NH_2 \quad VI$$

wherein $R^7$ is a bivalent organic radical carrying from 1 to 20 carbon atoms and optionally from 1 to 6 heteroatoms selected from O, S and N, e.g. $C_1$-$C_{20}$-alkanediyl which is optionally interrupted by 1, 2, 3 or 4 heteroatoms selected from O, S and/or an imino group and which may contain 1 or 2 C=C-double bonds, and which may, completely or partially, be a constituent of one or more saturated or unsaturated carbocyclic 5- to 8-membered rings or of a saturated or unsaturated 5- to 8-membered nitrogen heterocycle, where the alkanediyl may also carry one or more hydroxyl groups. $R^7$ may also be a divalent aromatic radical, such as 1,2-, 1,3- or 1,4-phenylene, which may carry 1, 2 or 3 substituents, selected from $C_1$-$C_4$-alkyl, $C_1$-$C_4$-alkoxy, $C_3$-$C_7$-cycloalkyl, halogen, OH etc. Preferably $R^7$ is $C_4$-$C_{20}$-alkanediyl which is interrupted by 1, 2, 3 or 4 nonadjacent oxygen atoms.

Examples of suitable diamines of formula VI comprise ethylene diamine, 1,3-propylene diamine, 1,6-hexane diamine, 1,4-diaminocylohexane, bis-(4-aminocyclohexyl)methane, bis(aminopropyl)methylamine, 4,4'-diaminodiphenylmethane, 1,4-bis-(3-aminopropyl)piperazine, 3-oxapentane-1,5-diamine, 3-Oxahexane-1,6-diamine, 4,7-dioxadecane-1,10-diamine, 4,8-dioxaundecane-1,11-diamine, 4,9-dioxadodecane-1,12-diamine and 4,7,10-trioxatridecane-1,13-diamine.

As is clear from the above, the modified polyaminoamides of the invention comprise repeating units of the formula II

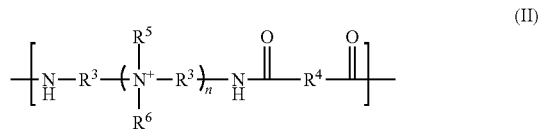

(II)

wherein n, $R^3$ and $R^4$ are as defined above and
$R^5$ is hydrogen, a radical R as defined above or a side chain of the formula I and $R^6$ may be a lone pair (electron pair, in this case there is no positive charge on the nitrogen) or is a radical selected from hydrogen, a radical R as defined above or a side chain of the formula I as defined above, provided that at least a part of the moieties $N^+R^5R^6$ are quaternized, i.e. they carry both a radical R and a polyether side chain of the formula I as defined above.

If the non-modified polyaminoamides are prepared in the presence of a diamine of formula VI, the obtained products as well as the modified polyaminoamides according to the invention will additionally comprise repeating units of the formula IIa

$$-[NH-R^7-NH]- \quad (IIa)$$

wherein $R^7$ is derived from the employed diamine of formula VI.

The non-modified polyaminoamides, which are used as a starting material in the process of the invention are obtained by reacting a dicarboxylic acid of formula IV or an amide forming derivative thereof with a polyalkylenpolyamine of formula V, optionally with an aliphatic, aromatic or cycloaliphatic diamine VI under reaction, conditions which lead to a polycondensation of the acid of formula IV and the amino compounds of formulae V and VI.

Suitable amide forming derivatives of dicarboxylic acids of formula IV are anhydrides, esters, amides or acid halides, in particular chlorides. Examples of such derivatives are maleic anhydride, succinic anhydride, phthalic anhydride and itaconic anhydride; adipic dichloride, esters of dicarboxylic acids IV with, preferably, $C_1$-$C_2$-alcohols, such as dimethyl adipate, diethyl adipate, dimethyl tartrate and dimethyl iminodiacetate; amides, such as adipic acid diamide, adipic acid monoamide and glutaric acid diamide. Preference is given to using the free carboxylic acids or the carboxylic anhydrides.

The molar ratio of dicarboxilic acid of formula IV to the total amount of polyalkylenepolyamine of formula V and diamine of formula VI is usually from 2:1 to 1:2, preferably from 1:1 to 1:2, more preferably from 1:1.05 to 1:1.7 and especially from 1:1.1 to 1:1.5.

Usually, the proportion of the diamine of formula VI does not exceed 50 mol-% and preferably 30 mol-% of the total molar amount of amino compounds of formulae V+VI. If desired, the diamine of formula VI makes up from 1 to 50 mol-%, preferably from 5 to 30 mol-% of the total molar amount of amino compounds of formulae V+VI. In a preferred embodiment, the diamine of formula VI makes up less than 5 mol-% of the total molar amount of amino compounds of formulae V+VI.

The polycondensation of the compounds of formulae IV and V (and optionally of formula VI) usually takes place by heating the polyamine V and the dicarboxylic acid IV to temperatures usually ranging from 100 to 250° C., preferably from 120 to 200° C., and distilling off the water which is formed during the condensation. If said carboxylic acid derivatives are used, the condensation can also be carried out at temperatures lower than those given. The preparation of the polyaminoamides can be carried out without the addition of a catalyst, or else with the use of an acidic or basic catalyst. Suitable acidic catalysts are, for example, acids, such as Lewis acids, e.g. sulfuric acid, p-toluenesulfonic acid, phosphorous acid, hypophosphorous acid, phosphoric acid, methanesulfonic acid, boric acid, aluminium chloride, boron trifluoride, tetraethyl orthotitanate, tin dioxide, tin butyldilaurate or mixtures thereof. Suitable basic catalysts are, for example, alkoxides, such as sodium methoxide or sodium, ethoxide, alkali metal hydroxides, such as potassium hydroxide, sodium hydroxide or lithium hydroxide, alkaline earth metal oxides, such as magnesium oxide or calcium oxide, alkali metal and alkaline earth metal carbonates, such as sodium, potassium and calcium carbonate, phosphates, such as potassium phosphate and complex metal hydrides, such as sodium borohydride. Where used, the catalyst is generally used in an amount of from 0.05 to 10% by weight, preferably 0.5 to 1% by weight, based on the total, amount of the starting materials.

The reaction can be carried out in a suitable solvent or preferably in the absence of a solvent. If a solvent is used, suitable examples are hydrocarbons, such as toluene or xylene, nitriles, such as acetonitrile, amides, such as N,N-dimethylformamide, N,N-dimethylacetamide, N-methylpyrrolidone, ethers, such as diethylene glycol dimethyl ether, ethylene glycol dimethyl ether, ethylene carbonate, propylene carbonate and the like. The solvent is generally distilled off during the reaction or when the reaction is complete. This distillation can optionally be carried out under a protective gas, such as nitrogen or argon.

Thereby non-modified polyaminoamides are obtained which have a number average molecular weight from 150 to 50,000, preferably from 250 to 10,000. The non-modified polyaminoamides can be characterized by $^1$H-, $^{13}$C- and $^{15}$N-NMR spectroscopy as well as by mass spectrometry (MS). MALDI MS can be used to determine the distribution of molecular weights and the kind of repeating units. The types of end groups can be determined by NMR. Since the non-modified polyaminoamides have a linear structure, the number average of the molecular weight can be determined from the ratio of the integrals of the NMR-signals.

In step i) of the process of the invention the introduction of the side chains of formula I with A being hydrogen can be achieved by analogy to know methods of alkoxylating amines. Preferably, the non-modified polyaminoamide starting material is reacted in a first step with an epoxide of formula III in the absence of a catalyst. Here, an aqueous solution of the polyaminoamide is expediently used. The reaction temperature is usually at least 70° C. and preferably ranges from 70 to 200° C., in particular from 80 to 160° C. The reaction can be carried out in the reactors customary for this purpose. The application of increased pressure is, in principle, not necessary. However, it is advantageous, if the components in the reaction are volatile as is the case when $R^1$ is hydrogen. The reaction pressure can be up to 50 bar, preferably up to 10 bar. Thereby, a polyaminoamide is obtained wherein most or all of the hydrogen atoms in the amino groups of the starting material are replaced by a radical $CH_2$—$CR^1R$—OH, wherein $R^1$ and $R^2$ are as above (i.e. side chains of formula I with p=1).

To obtain modified polyamidoamines carrying side chains of formula I, with p being greater than 1, the thus obtained polyaminoamide is reacted with further amounts of epoxide of formula II. The reaction is preferably carried out in the presence of a base as catalyst. Examples of suitable bases are alkali metal and alkaline earth metal hydroxides, such as sodium hydroxide, potassium hydroxide and calcium hydroxide, alkali metal alkoxides, e.g. the sodium and the potassium alkoxides of $C_1$-$C_4$-alkanols, such as sodium methoxide sodium ethoxide and potassium t-butoxide, and also sodium hydride and calcium hydride and alkali metal carbonates, such as sodium carbonate or potassium carbonate. Preferred bases are the alkali metal hydroxides and alkali metal alkoxides. The base is generally used in an amount of from 0.05 to 10% by weight, preferably from 0.5 to 2% by weight, based on the total amount of the starting materials.

The reaction of step i) may be carried out in a solvent, preferably in an anhydrous solvent. Suitable solvents are aliphatic and aromatic hydrocarbons, such as hexane, cyclohexane, toluene, xylenes, and similar solvents. It is also possible to use polar aprotic solvents e.g. ethers, such as tetrahydrofurane, dioxane, N,N-dialkylamides, such as dimethylformamide and diemthylacetamide, N-alkyl lactames such as N-methyl pyrrolidone, and mixtures thereof as well as mixtures thereof with the aforementioned hydrocarbons.

The reaction temperature is usually at least 70° C. and is preferably 70 to 200° C., in particular 100 to 180° C. The reaction can be carried out in the reactors customary for this purpose. The application of increased pressure is, in principle, not necessary. However, it is advantageous if the components in the reaction are volatile as is the case when $R^1$ is hydrogen. The reaction pressure can be up to 50 bar, preferably up to 10 bar. A skilled person will appreciate, that side chains of formula I having a cooligomeric structure can be obtained either by adding a mixture of different epoxides of formula III, which will lead to a random distribution of the different moieties, or by sequential addition of different epoxides, which will lead to a blockwise arrangement.

Work-up of the alkoxylated polyaminoamide obtained in the reaction of the non-modified polyaminoamide starting material with epoxide of formula III can be achieved in conventional manner. If the reaction was performed in an organic solvent, the reaction mixture is usually worked up by removing the solvent and replacing it by water. Thus, aqueous solutions of the alkoxylated polyamidoamines are obtained, which can be used directly in step ii) of the process according to the invention. It is of course also possible to isolate the alkoxylated polyaminoamides in substance by removing the volatile constituents from the reaction mixture. If no solvent was used the alkoxylated polyaminoamide will be obtained in substance after the reaction and can directly be used in step ii) of the process according to the invention.

It has been proven advantageous to treat the reaction product obtained in step ii) with small amounts of $C_2$-$C_6$-alkylene oxide, in particular ethylene oxide. By this treatment, an, unpleasant odor, which results from amine by-products, can be reduced. The required amount of alkylene oxide is generally less than 0.8 mol per mol of amino hydrogen of the polyaminoamide starting material, in particular from 0.1 to 0.7 mol per mol of amino hydrogen. The treatment can be performed in a solvent, in particular in water. Preferably, the treatment is performed at a pH ranging from 4 to 10, in particular from 7 to 9. The treatment is preferably performed at temperatures ranging from 50 to 140° C., in particular from 70 to 120° C. Preferably, pressure is applied. The treated product can be stripped with steam in order to remove any impurities formed.

The alkoxylated polyaminoamides obtained in step i) are then reacted with an alkylating agent (step ii). As used herein, the term "alkylating agent" refers to a compound R—X, wherein R is as defined above and X is a leaving group, which is capable of being replaced by nitrogen, and to oxiranes having from 2 to 6 carbon atoms, usually $C_2$-$C_6$-alkylene oxides. Suitable leaving groups X are halogen, especially chlorine, bromine or iodine, sulfate (i.e. —O—$SO_3$H or —O—$SO_3^-$), alkylsulfonate such as methylsulfonate, arylsulfonate such as tolylsulfonate, and alkyl sulfate, such as methosulfate (i.e. —O—$SO_2$—$OCH_3$). Preferred alkylating agents R—X are $C_1$-$C_6$-alkyl halides, Bis-($C_1$-$C_6$-alkyl)sulfates and benzyl halides. Examples of such alkylating agents are ethyl chloride, ethyl bromide, methyl chloride, methyl bromide, benzyl chloride, dimethyl sulfate and diethyl sulfate. Preferred $C_2$-$C_6$-alkylene oxides as alkylating agents are ethylene oxide and propylene oxide.

The amount of alkylating agent determines the amount of quaternization of the amino groups in the polymer backbone, i.e. the amount of quaternized moieties (a), (b1) and (b2). In general, the amount of R—X is from 0.1 mol to 2 mol, especially from 0.5 mol to 1.5 mol and more preferred from 0.7 mol to 1.2 mol per mol of amino groups in the modified polyaminoamide obtained in step i). In general, the amount of oxiranes used as alkylating agent is from 0.1 mol to 2 mol, especially from 0.5 mol to 2 mol and more preferred from 0.7 mol to 1.5 mol per mol of amino groups in the modified polyaminoamide obtained in step i).

If an alkylating agent R—X is used, the reaction temperature is usually in the range of from 10 to 150° C. and is preferably from 30 to 120° C., in particular 50 to 110° C., especially if dialkyl sulfates or benzyl chloride is used as alkylating agent.

The reaction can be carried out in reactors customary for this purpose. The application of increased pressure is, in principle, not necessary. However, it may be advantageous to apply increased pressure, if the alkylating agent is volatile. Then the pressure may be up to e.g. 50 bar.

The reaction can be carried out without any solvent. However, a solvent or diluent may be used. Suitable solvents or diluents are water, organic solvents having a high dipole moment, such as dimethyl sulfoxide, acetonitrile, propionitrile, dialkylamides, such as dimethyl formamide, dimethyl acetamide, N-methyllactams, such as N-methyl pyrrolidone, peralkylated ureas, such as tetramethyl urea, N,N'-dimethylethylene urea, N,N'-dimethylpropylene urea, etc. and mixtures thereof as well as mixtures thereof with water or with a less polar solvent, such as the aforementioned ethers and hydrocarbons.

Radicals R of the formula Alk-O—H can be introduced by reacting the alkoxylated polyaminoamide obtained in step i) with $C_2$-$C_6$-alkylene oxides, preferably ethylene oxide or propylene oxide, by analogy to the method described in Houben-Weyl, Methoden der organischen Chemie, $4^{th}$ ed., vol. XI/2, p. 608-613. The reaction with alkylene oxides is usually carried out at temperatures from 30° C. to 120° C., preferably from 30 and 100° C. The reaction can be carried out in the absence of a solvent (solvent-free) or in any of the organic solvents mentioned above for the alkoxylation reaction in step i). The reaction must be carried out in the presence of a source for the required counter ions. The counter ions may be provided by water (OH⁻) or by an acid. The reaction is preferably carried out in the presence of an acid. Suitable acids are mineral acids such as sulfuric acid, nitric acid and hydrogen chloride. The reaction is preferably carried out in the presence of water and an acid to provide counter ions other than hydroxyl.

The application of increased pressure, either by addition of nitrogen or increased alkylene oxide pressure, can be advantageous in order to achieve higher degrees of quaternization.

In the thus obtained cationic modified polyaminoamide, at least a part of the nitrogen atoms of the polymer backbone carry both a radical R and side chains of the formula I, wherein A is hydrogen. The counter ions, which are required to compensate the positive net charge of the modified polyaminoamide usually correspond to the group X of the alkylating agent. If alkylation is performed by reaction with an oxirane, the counter ion corresponds to the acid used as catalyst.

The thus obtainable cationic modified polyaminoamides carry hydroxyl groups as terminal groups of the side chains of formula I and, if present, in the form of groups Alk-OH. These hydroxyl groups can be esterified in step iii), thereby obtaining ",polyaminoamides of the invention, wherein A is selected from $PO((OH)_2$ and $S(O)_2OH$. These hydroxyl groups can also be etherified with compounds of the formula L-$B^3$-A' as defined above.

The esterification can be achieved by reacting the modified polyaminoamides obtained in step ii) with sulfuric acid or with a derivative thereof, e.g. with chlorosulfonic acid, sulfur trioxide, amidosulfonic acid, if a $SO_3H$ group shall be introduced as radical A. In order to produce the phosphate esters, i.e. A is $PO_3H_2$, the modified polyaminoamides obtained in step ii) are reacted with a suitable derivative of phosphoric acid, such as polyphosphate, phosphoryl chloride/water or phosphorpentoxide. Methods for esterification of terminal hydroxyl groups in polyether chains are in principle known in the art and can be applied in analogy to obtain the polyaminoamides of the present invention (see e.g. Ullmann's Encyclopedia of Industrial Chemistry, Sixth Edition, 2000 Electronic Release SURFACTANTS—Anionic Surfactants (Kurt Kosswig) 6.3. Sulfates and 6.4 phosphates; THIN-FILM REACTORS—Thin Film Reactors for Industrial Sulfonation (Bernhard Gutsche, Christoph Breucker, Günter Panthel); CHLOROSULFURIC ACID—Chemical Properties (Joachim Maas, Fritz Baunack); Stache (Hrsg.), Anionic Surfactants—Organic Chemistry, S. 647-696, New York: Dekker 1995.

If sulfuric acid or oleum is used, an excess of the sulfating agent is usually employed. The reaction is usually carried out at a temperature ranging from 40 to 130° C., preferably from 60 to 110° C. The reaction is preferably carried out in the absence of a solvent. Usually reduced pressure is applied. Preferably the pressure is below 20 mbar.

Preferably a inert gas such as nitrogen is lead through the reaction mixture as a stripping gas. The reaction may also be carried out in an inert solvent. Then the solvent preferably has a boiling point above 120° C. The amount of sulfuric acid (or oleum) determines the degree of sulfation (i.e. the ratio of side chains I carrying a group $SO_3H$ to side chains carrying a hydrogen atom).

In case of chlorosulfonic acid as esterifying agent usually equimolar amounts or a slight excess with respect to the desired stoichiometry, are used. The excess usually will not exceed 10 mol-%. The reaction temperature usually ranges from −10 to 60° C., preferably from −10 to 40° C. The reaction can be carried in a common solvent, which is inert towards chlorosulfonic acid. The reaction may also be carried out in the absence of a solvent. Preferably, the reaction is carried out in the presence of an auxiliary base in order to neutralize the hydrogen chloride formed in the reaction. Suitable bases comprise alkali metal hydroxides, such as sodium hydroxide, alkali metal carbonates and tertiary amines. The base is usually employed in at least equimolar amounts with respect to the amount of chlorosulfonic acid.

In case of sulfur trioxide acid as esterifying agent usually equimolar amounts of sulfur trioxide; based on the desired stoichiometry are employed. The reaction can be carried out in analogy to the method described in W. H. de Groot: Sulfonation Technology in Detergent Industry, Kluwer Academic Publ., Dordrecht 1991. The reaction is usually carried out in a continuously operating short-time sulfonation reactor. Generally the reaction temperature does not exceed 50° C. and preferably ranges from −10 to 50° C. Preferably sulfur trioxide is diluted, preferably with air or an inert gas such as nitrogen. Preferably sulfur trioxide is diluted from 1 to 10 vol-%. The reaction product is usually neutralized with a base, e.g. a base mentioned for the reaction with chlorosulfonic acid, preferably sodium hydroxide. Preferably the reaction mixture is neutralized as quickly as possible.

The introduction of phosphate groups by use of polyphosphoric acid is usually performed at temperatures ranging from 20 to 150° C., preferably from 50 to 120° C. The reaction time may range from 0.5 to 24 h, preferably from 1 to 12 h. With respect to the desired degree of phosphation at least an equimolar amount of reactive phosphorous compound has to be employed. In general, the amount will be from 1 to 10 mol per mol of hydroxyl groups to be phosphatized. It may be advantageous to conduct the reaction under increased pressure by nitrogen. The reaction can be performed in common organic solvents, or, preferably, solvent-free.

If a dialkylsulfate is used for the quaternization of the nitrogen atoms, a part of the acidic groups are always sulfate groups, because a trans-sulfation reaction (see below) occurs during the reaction with the phosphorous compounds. The use of phosphorous pentoxide as phosphation reaction yields mono- as well as diesters.

Modified polyaminoamides of the invention, wherein A is $SO_3H$ and R is $C_1$-$C_6$-alkyl, especially methyl, can be also obtained from the alkoxylated modified polyaminoamides obtained in step i) by reaction with di-$C_1$-$C_6$-alkylsulfates, especially dimethyl sulfate, according to the process described in WO 02/12179. This process is referred to as "trans-sulfation". Hereby the di-$C_1$-$C_6$-alkylsulfate reacts with the alkoxylated polyaminoamide of step i) to yield the quaternized product of step ii) which contains mono-$C_1$-$C_6$-alkylesters of sulfuric acid as counter ions. These mono-$C_1$-$C_6$-alkylesters of sulfuric acid act as a sulfating agent in step iii).

The trans-sulfation reaction is usually carried out at a pH below 2.5. The reaction temperature is usually from 40 to 130° C., preferably from 60 to 110° C. Preferably the reaction is carried out in the absence of a solvent. Preferably reduced pressure is applied. More preferably the pressure is below 20 mbar. It has been proven advantageous to lead, an inert gas, such as nitrogen through the reaction mixture as a stripping gas. The reaction may also be carried out in an inert solvent. Then the solvent preferably has a boiling point above 120° C.

The introduction of the group $B^3$-A' at the termini of the polyether side chains I, especially of a carboxylic acid functionality $B_2$—COOH, can be achieved by etherification of the terminal hydroxyl groups of I with halocarboxylic acids Hal-$B^2$—COOH (Hal=halogen, especially chlorine or bromine, $B^2$ as defined above), especially with α-halocarboxylic acids, such as chloroacetic acid. The etherification can be performed by analogy to known methods for the production of carboxymethylcellulose (Houben-Weyl E20, p. 2072-2076 and Ullmann, 5th ed., A5, p. 477-478). Usually the reaction will be performed in the presence of a base, which is preferably employed in large excess, based on the stoichiometry of the reaction. Preferred bases are alkaline, such as NaOH or KOH. The halocarboxylic acid is usually employed in excess, based on the desired stoichiometry. The reaction can either be conducted solvent-free, in water, in an inert organic solvent, preferably in an alkanol, such as isopropyl alcohol, tert-butyl alcohol etc. or in a ketone, such as acetone, methyl ethyl keton, in a mixture of the aforementioned solvents or in a mixture of at least one of these solvents with water.

The modified polyaminoamides obtained according to the invention may also be subjected to a discoloration step, e.g. by reacting them with hydrogen peroxide.

The modified polyaminoamides according to the invention are useful in particular as additives for solid and liquid laundry detergents. They excellently disperse particulate soiling in the aqueous wash liquor and thus prevent redeposition of the soiling onto the fabric during washing. Thereby they prevent graying of the textiles. In addition, they improve the primary detergency of both liquid and of solid detergents in particular with respect to particulate soiling, especially with respect to mineral soiling, such as clay minerals, which are the major components of earth-like soiling. However, also hydrophobic, oil- and grease-containing soilings are removed more easily by detergent compositions containing the modified polyaminoamides of the invention. In particular, detergent compositions containing the modified polyaminoamides are superior in removing earth-like soilings from surfaces especially from fabrics. In addition, modified polyaminoamides of the invention can be easily incorporated into solid and liquid detergent formulations without impairing the stability and homogeneity of these formulations. Undesired phase formations and precipitations are not observed even upon prolonged storage.

The modified polyaminoamides of the invention also show excellent dispersing properties for fine particulate solids, e.g. for organic pigments and in particular for inorganic pigments and inorganic fillers. Therefore, the invention also relates to the use of the modified polyaminoamides as defined above as dispersants. They are especially useful for dispersing inorganic pigments in aqueous medial. Inorganic pigments and fillers, for which the modified polyaminoamides of the invention are useful dispersants, comprise colored pigments, black pigments, luster pigments, transparent pigments, luminous pigments, anti-corrosive pigments, magnetic pigments and especially white pigments such as titanium dioxide and zinc oxide, and also fine particulate fillers, such as calcium carbonate, calcium sulfate, barium sulfate, talcum and also pigment soot and graphite.

The modified polyaminoamides of the invention are especially useful as dispersing aids for mineral pigments, especially for clay, such as kaolin, bentonite and for clay minerals, such as kaolinit, illites, smektites (e.g. montmorillonit) and chlorite.

The modified polyaminoamides of the invention stabilize dispersions of, particulate solids of low, medium and high concentration. They are especially useful for stabilizing dilute dispersions (e.g. 0,001-1% by weight of particulate solids), which are in particular sensitive to interfering substances such as the hardness components of water or anionic surfactants. However, dispersions of medium as well as of high concentrations of up to 85% by weight can be stabilized effectively.

In general, the amount of modified polyaminoamides which is necessary to achieve a stable dispersion will be at least 0.05% by weight, and preferably at least 0.1% by weight, based on the amount of pigment to be dispersed. Usually the modified polyaminoamides will be employed in amounts from 0.05 to 5% by weight and especially from 0.1 to 2% by weight.

It must be noted that the modified polyaminoamides of the invention show excellent dispersant properties even in the presence of compounds, such as water-hardening ions, e.g. calcium and magnesium or anionic surfactants, which usually impair the properties of conventional dispersants, such as polymers based on acrylic acid and/or maleic acid or sodium carboxymethylcellulose.

The examples below serve to illustrate the invention.

Analytics

The amine number was determined according to the method described in DGF Einheitsmethoden—Abteilung H—Tenside, Methode H-III 20a (98) "Potentiometrische Titration des Gesamtbasenstickstoffs von Tensiden" (DGF standard methods—section H—surfactants, method H-III 20a (98) "Potentiometric titration of the total basic nitrogen I surfactants").

The acid number was determined according to the method as described in Europäisches Arzneibuch 4. Ausgabe 2002, S. 127 (Pharmacopoea Europaea, 4. ed. 2002, page 127) or DGF Einheitsmethoden—Abteilung C—Fette, Methode C-V (DGF standard methods—section F—fats, method C-V).

SYNTHESIS EXAMPLES

I. Synthesis of Non-Modified Polyaminoamides

At room temperature the polyalkylenepolyamine of formula V was charged into a 2 l glass round bottom flask equipped with a distillation bridge. The reactor was purged with nitrogen and x g of deionized water were added. Thereby the temperature rose to about 50° C. The mixture was heated to 60° C. and adipic acid was added within 5 minutes. Thereby, the temperature rose to about 100° C. The reaction mixture was heated to 120° C. and stirred at this temperature for one hour. Then the temperature was slowly increased to 180-190° C. and water and unreacted amine were distilled off for at least 3 h until the amount of condensated water had reached at least the theoretical value for a fully condensed product and the acid number was below 10 mg KOH/g. Then the reaction mixture was cooled to between 120° C. and 180° C. and diluted with y g of deionized water to give a white or slightly yellow polyaminoamide solution with an active content from 60 to 90% by weight. Depending on the active content, the degree of condensation and the identity of the amine and acid component the product was a liquid of high viscosity or a solid.

The starting materials and the amounts employed are given in table 1:

TABLE 1

| Polyaminoamide | Amine component | Amine m [g] | Acid [g] | Molar Ratio amine:acid | Water x [g] | Water y [g] | Active Content [%] |
|---|---|---|---|---|---|---|---|
| A1 | DETA | 587 | 780 | 20:19 | 173 | 740 | 60 |
| A2 | DETA | 361 | 460 | 10:9 | 110 | 170 | 89 |
| A3 | DETA | 516 | 585 | 5:4 | 129 | 240 | 88 |
| A4 | N4-Amine | 471 | 355 | 10:9 | 115 | 185 | 85 |
| A4' | DETA | 826 | 936 | 5:4 | 207 | 1395 | 75 |
| A5 | N4-Amine | 479 | 322 | 5:4 | 120 | 180 | 81 |
| A6 | N4-Amine | 522 | 292 | 3:2 | 131 | 186 | 80 |
| A7 | DETA | 425 | 585 | 36:35 | 106 | 577 | 60 |

DETA: Diethylenetriamine,
N4-Amine:
N,N'-Bis(3-aminopropyl)ethylenediamine

II. Introduction of the Side Chains of the Formula I

1. Reaction with 1 mol Ethylene Oxide Per mol NH-Groups (General Procedure)

The aqueous solution of the polyaminoamide was charged into a 2 l metal reactor and then rendered inert by applying 3 to 5 bar of nitrogen for 3 times. The reactor contents were heated to 90-130° C. and then the required amount of ethylene oxide was added in portions (total amount equimolar to the amino hydrogens present in the polyaminoamide) in such a way that the pressure slowly rose. The pressure was then further increased by addition of nitrogen until a pressure of 5-8 bar was reached and the reaction mixture was then stirred at 90-130° C. until the pressure remained constant. Following cooling to 70-80° C. (50° C. for C9) the reactor was flushed with 3 bar of nitrogen and residual ethylene oxide was removed on a rotary evaporator. The resulting alkoxylated polyaminoamide was yellow or lightly brown in color and depending on the active content, the degree of condensation and the identity of the amine and acid component the product was a liquid of high viscosity or a solid.

2. Preparation of the Alkoxylated Polyamiodamines C1 to C7 (General Procedures A to C)

Method A:

The aqueous solution of the modified polyaminoamide obtained according to step 1, the catalyst and xylene were charged in a 2 l metal reactor and rendered inert as described above. The mixture was heated to 130-160° C. under a nitrogen stream to remove the water from the reaction mixture. The reactor content was cooled down to 120-150° C. and then ethylene oxide was added in portions in such a way that the pressure slowly rose. The pressure was then further increased by addition of nitrogen until a pressure of 5-8 bar was reached and the reaction mixture was then stirred at 120-150° C. until the pressure remained constant. Following cooling to 80° C. the reactor was flushed with 3 bar of nitrogen to remove residual ethylene oxide. Xylenes were removed at 120° C. by introducing 4 bar of hot steam. The alkoxylated polyaminoamide was obtained as a dark brown aqueous solution with an active content of 67% and a pH of 10.5.

Method B:

The aqueous solution of the polyaminoamide obtained according to step 1 and the catalyst were mixed and water and other volatile components were removed at 80-120° C. under reduced pressure. The mixture was charged into a 2 l metal reactor and rendered inert as described above. At 120-150° C. the alkylene oxide was then added in portions in such a way that the pressure slowly rose. The pressure was then further increased by addition of nitrogen, until a pressure of 5-8 bar was-reached, and the reaction mixture was stirred at 120-150° C., until the pressure remained constant. In case of stepwise addition of different akylene oxides, a period of at least 2 hours, during which the pressure remained constant, was allowed to pass after addition of each alkylene oxide before the next alkyleneoxide was added. Following cooling to 80-90° C. the reactor was flushed with 3 bar of nitrogen and residual ethylene oxide was removed in a rotary evaporator.

Method C:

Water was removed from the aqueous solution of the polyaminoamide obtained according to step 1 at 80-120° C. under reduced pressure. The mixture was cooled to 50° C. and under a nitrogen atmosphere the catalyst was added and volatile compounds were again removed from the mixture at 80-120° C. under reduced pressure. The mixture was charged into a 2 l metal reactor and rendered inert as described above. At 120-150° C. the alkyleneoxide was added in portions in such a way that the pressure slowly rose. The pressure was then further increased by addition of nitrogen, until a pressure of 5-8 bar was reached, and then the reaction mixture was stirred at 120-150° C., until the pressure remained constant. Following cooling to 80-90° C. the reactor was flushed with 3 bar of nitrogen and residual ethylene oxide was removed on a rotary evaporator.

The employed method, the starting materials and the amounts employed are given in table 2.

was stirred for further 3 hours at 90° C. Then the reaction mixture was heated to 115° C. and steam was introduced for 1.5 hours at 4 bar. After cooling to 100° C., a vacuum of 20 mbar was applied in order to remove residual water. 807 g of the modified compound were obtained (amine titer 0.697 mmol/g).

TABLE 2

| | Polyaminoamide[1] | | Alkylene Oxide | | | | |
|---|---|---|---|---|---|---|---|
| | type[2] | amount [g][3] | type[4] | [g] | [mol][5] | Catalyst | Method |
| C1 | A1 | 205 g (69% aqu. sol. + 280 g xylenes) | EO | 524 | 24 | 1.6 g 40% aqueous solution of KOH | A |
| C2 | A2 | 125 g (92% aqu. sol.) | EO | 1154 | 44 | 0.6 g crystalline potassium tert.-butoxide | C |
| C3 | A3 | 110.1 g (86% aqu sol.) | EO PO EO | 250 365 665 | 10 10 24 | 0.47 g crystalline potassium tert.-butoxide | B |
| C4 | A3 | 105.2 (86% aqu. sol.) | EO | 609 | 24 | 0.45 g crystalline potassium tert.-butoxide | B |
| C5 | A4 | 166.5 (85% aqu. sol.) | EO | 907 | 24 | 0.71 g crystalline potassium tert.-butoxide | B |
| C6 | A5 | 166.7 (84% aqu. sol.) | EO | 1298 | 30 | 0.7 g crystalline potassium tert.-butoxide | B |
| C7 | A6 | 129 g (86.5% aqu. sol.) | EO | 954 | 24 | 0.56 g crystalline potassium tert.-butoxide | C |

[1] modified polyaminoamide of step 1
[2] non-modified polyaminoamide starting material according to I, which is employed in step 1
[3] amount of polyaminoamide obtained according to step 1 as an aqueous solution
[4] EO = ethylene oxide; PO = propylene oxide
[5] mol alkylene oxide per mol amino bound hydrogen atoms in the non-modified polyaminoamide 3. Preparation of Alkoxylated Polyaminoamide C8

A 5 l metal reactor was charged with 2055 g of the aqueous reaction mixture of polyaminoamide A4', heated to 60° C. and purged three times with nitrogen at 5 bar. Then the reactor was heated to 90° C. and ethylene oxide (634.5 g, 14.42 mol) was added in portions. The reactor content was stirred at 90° C. until the pressure remained constant. The reactor was cooled to 60° C. and then purged three times with 3 bar of nitrogen. 2680 g of an aqueous solution of the reaction product was obtained having a solids content of 80.6% by weight. The solution was diluted with water to a solids content of 78.2% by weight.

171.1 g of the aqueous solution of the reaction product were charged in a 2 l metal reactor. 13.27 g of aqueous potassium hydroxide (40%) were added and the reactor was purged three times with 5 bar of nitrogen. The reactor was heated to 120° C. and a vacuum of 20 mbar was applied to remove water. After 3 hours the reactor was purged with nitrogen. Then 928 g ethylene oxide were added within 5 hours at 120° C. and the reaction mixture was stirred for further 2 hours until the pressure remained constant. Following cooling to 80° C., the reactor was flushed with nitrogen to remove residual ethylene oxide. 1055 g product were obtained having 24 mol ethylene oxide per mol of amino groups. The amine titer was 0.823 mmol/g.

814 g of the compound of the previous step were diluted with 90.4 g of water and sulfuric acid (96%, 8.89 g) was added. The reactor was flushed three times with 5 bar of nitrogen. Then the reactor was heated to 90° C. and ethylene oxide (28 g) was added in portions and the reaction mixture 4. Preparation of Alkoxylated Polyaminoamide C9

The aqueous solution of the polyaminoamide A7 was charged into a 2 l metal reactor at 50° C. and then the reactor contents were rendered inert by, applying 5 bar of nitrogen for three times. The reactor contents were heated to 90° C. and 183.3 g ethylene oxide were added in portions. The reaction mixture was stirred until the pressure remained constant. After cooling to 50° C., the reactor was flushed three times with 3 bar of nitrogen. 1350 g of a 63.5% aqueous solution of the reaction product were obtained (amine titer 2.83 mmol/g). 260 g of the aqueous reaction mixture and 2.28 g potassium hydroxide (40% aqueous solution) were charged into a 2 l metal reactor and the reactor was flushed with 5 bar of nitrogen. The reactor contents were heated to 120° C. and a vacuum of <10 mbar was applied to remove water. After 4 hours the reactor was flushed with nitrogen. 789.5 g of ethylene oxide were added at 120° C. and the reaction mixture was stirred until the pressure remained constant. Following cooling to 80° C., the reactor was flushed three times with 5 bar of nitrogen. Thereby, 964 g of ethoxylated polyaminoamide with 24 mol EO per mol of aminic hydrogen was obtained. 432.3 g of the thus obtained compound were charged into a 2 l metal reactor and the reactor was flushed for three times with 5 bar nitrogen. The reactor was heated to 120° C. The reactor was evacuated to <10 mbar at 120° C. for 30 minutes. Then the reactor was flushed again with nitrogen and 168 g of ethylene oxide were added at 120° C. and the reaction mixture was stirred until the pressure remained constant. After cooling to 80° C., the reactor was flushed three times with 5 bar of nitrogen. Thereby, 610 g of a compound having about 35.6 mol ethylene oxide per mol of aminic NH was obtained. The amine titer was 0.706 mmol/g.

III. Quaternization (Examples 1 to 9)

a) Reaction with Dimethyl Sulfate

Example 1: (Polyaminoamide D1: [DETA:AA 20:19]+24 mol EO/NH, 75% Methylquat*)

390 g of the aqueous solution of the modified polyaminoamide C1 obtained according to II (66% active content) were charged in a 0.5 l reaction flask under a nitrogen atmosphere. The mixture was heated to 60-70° C. and 25.3 g of dimethyl sulfate (1 mol per mol of amino groups) were added in portions within 4 hours. The reaction mixture was kept at 60-70° C. until the Preussmann's test** for determination of alkylating substances was negative. A modified polyaminoamide with a degree of quaternization of 75% (calculated from the amine number) was obtained as a dark brown liquid with a pH of 5.5.
*% of amino nitrogens quaternized with methyl groups
**R. Preussmann et al. Arzneim.-Forschung 19, 1059 (1969)

Examples 2 to 6, 8 and 9

General Procedure (Modified Polyaminoamides D2 to ; D6, D8, D9)

The modified polyaminoamide obtained according to II (100% active content) was charged in a 1 l reaction flask under a nitrogen atmosphere. The mixture was heated to 60° C. and dimethyl sulfate was added in portions leading to a rise in temperature to about 70° C. after the first addition of the major amount of dimethylsulfate. The reaction mixture was kept at 70°-80° C. until the Preussmann's test was negative. A modified polyaminoamide with a degree of quaternization above 90% (calculated from the amine number) was obtained as a dark brown solid or viscous liquid with an acidic pH. The starting material and the amount of dimethyl sulfate being used is given in table 3.

TABLE 3

| Example | Starting Material type | [g] | Dimethyl-sulfate [g] | equivalent | Quaternization* [%] |
|---|---|---|---|---|---|
| 2 | D2 | C2 | 900 | 52.2 | 0.95 | 93 |
| 3 | D3 | C3 | 800 | 43.5 | 1.0 | 92 |
| 4 | D4 | C4 | 667 | 56.5 | 0.95 | 93 |
| 5 | D5 | C5 | 916 | 89.2 | 0.93 | 93 |
| 6 | D6 | C6 | 850 | 69.9 | 0.945 | 94 |
| 9 | D8 | C8 | 762 | 63.6 | 1.0 | 95 |
| 9 | D9 | C9 | 542.4 | 45.9 | 1.0 | 93 |

*calculated from the amine number b) Quaternization with Benzyl Chloride

Example 7: (Polyaminoamide D7: [N4-Amin:AA 3:2]+24 EO/NH, 68% Benzylquat*)

365 g of the modified polyaminoamide C7 obtained according to II (100% active content) were charged in a 1 l reaction flask under a nitrogen atmosphere and diluted with 56.4 g of distilled water. The solution was heated to 90° C. and 28.6 g of benzyl chloride (0.75 mol per mol of amine functionalities) were added within 15 minutes. The reaction mixture was kept at 90° C. for 90minutes and then 2.5 g of a 50% by weight aqueous solution of sodium hydroxide were added and the reaction mixture was stirred for another 3 hours at 90° C. To destroy residual benzyl chloride, a solution of 4.7 g of sodium acetate in 38 g of distilled water was added to the reaction mixture, and the obtained mixture was stirred for another 4 hours at 90° C.
* % of amino nitrogens quaternized with benzyl groups

IV Introduction of Acidic Groups (Examples 10 to 16)

a) Trans-Sulfation-Process

Examples 10 to 13

General Procedure (Modified Polyaminoamides E1, E3, E5 and E6)

The modified polyaminoamide D1, D3, D5 or D6 obtained according to III, Quaternization examples 1, 3, 5 and 6 (as an aqueous solution or material with >98% active content), was introduced into a 1 l reaction flask under a nitrogen atmosphere and heated to 60° C. Concentrated sulfuric acid was added in portions, thereby decreasing the pH of the mixture to ≦2.4. The reaction mixture then was stirred for 3 hours at 90° C. and a pressure of ≧20 mbar with nitrogen passing through the mixture to remove water and the methanol formed. After decompression with nitrogen and cooling to 60° C. z g of a 50% by weight aqueous solution of sodium hydroxide were added in portions to obtain the product as a brown aqueous solution (active content >95% by weight) with a pH ranging from 8 to 9. The product was either a liquid of high viscosity or a waxy solid. The type of starting material and the relative amounts of reactants are given in table 4.

TABLE 4

| Example | type | Starting Material [g] | Sulfuric acid [g] | NaOH sol.z [g] | Degree of quaternization | Degree of sulfation |
|---|---|---|---|---|---|---|
| 8 | E1 | D1 | 365 | 3.8 | 7.0 | 92 | 92 |
| 9 | E3 | D3 | 400 | 6.4 | 8.2 | 92 | 78 |
| 10 | E5 | D5 | 515 | 6.1 | 6.8 | 86 | 86 |
| 11 | E6 | D6 | 450 | 4.5 | 5.3 | 81 | 82 |

Example 14

Polyaminoamide E8

A reaction vessel was charged with 800 g of compound D8 and heated to 70° C. under nitrogen. Then 2.93 g sulfuric acid (96%) were added at 70° C. and the mixture was stirred for 5 minutes. The temperature was increased to 90° C. and a vacuum of <10 mbar was applied. The reaction mixture was stirred for 45 minutes. Then nitrogen was introduced and the reaction mixture was stirred at 90° C. for 3 hours. The temperature was lowered to 60° C. and at 60° C. the pH was adjusted to 8.1 with 50% aqueous sodium hydroxide. Thereby, 765 g of the product were obtained. The iodine color of a 10% aqueous solution was 5.9. The structure was confirmed by $^1$H—NMR.

385 g of the reaction mixture were charged into a reaction vessel and under nitrogen 3.85 of hydrogen peroxide (30%) were added at 60° C. The mixture was stirred for 30 minutes. The iodine color of an aqueous 10% solution of the thus obtained product was 4.8.

Example 15

Modified Polyaminoamide E9

292 g of compound D9 were charged into a reaction flask and heated to 70° C. under nitrogen. Then 3.74 g sulfuric acid (96%) were added at 70° C. and the mixture was stirred for 5 minutes. The temperature was increased to 90° C. and a vacuum of <10 mbar was applied. The mixture was stirred for further 3 hours. The reaction flask was flushed with nitrogen and the temperature was lowered to 60° C. At 60° C. 438 g aqueous sodium hydroxide (50%) were added to adjust the pH to 8.12. The reaction mixture (285 g) has a solids content of 98.4%. The structure of the compound was confirmed by $^1$H-NMR.

b) Sulfation with Sulfuric Acid

Example 16

Synthesis of E2: [DETA:AA10:9]+44 EO/NH, 93% Methylquat, 100% Sulfation 202 g of the modified polyaminoamide D2 obtained according to III, Quaternization example 2, were introduced into a 0.5 l reaction flask under a nitrogen atmosphere and heated to 60° C. 4 g of concentrated sulfuric acid were added and the reaction mixture was then stirred for 8 hours at 90° C. and a pressure of ≦20 mbar with nitrogen passing through the mixture to remove the methanol and the condensation water formed. After decompression with nitrogen and cooling to 60° C. the pH was adjusted to 8.5 by adding a 50% by weight aqueous solution of sodium hydroxide. The product was obtained as a brown liquid of high viscosity.

c) Reaction with Polyphosphoric Acid

Examples 17 and 18

General Procedure (Modified Polyaminoamides E4:and E7)

The modified polyaminoamide D4 or D7 obtained according to III, Quaternization examples 4 and 7, was introduced into a 0.25-0.5 l reaction flask under nitrogen atmosphere and heated to 65° C. (For example E7 water was first evaporated.) Polyphosphoric acid was added within 10-30 minutes and at the same time the temperature was raised to 75° C. After stirring for 6 hours at 75° C. the product was obtained as a dark brown waxy solid with a pH between 2 and 3.5. The amount of the reactants and the degree of phosphation is given in table 5.

TABLE 5

| Example | Starting Material type | quaternization | amount [g] | HPO$_3$* [g] | Degree of phosphation |
|---|---|---|---|---|---|
| 17 | E4 | D4. 93% methyl | 275 | 24.25 | 100 |
| 18 | E7 | D7. 68% benzyl | 238 (80% aqu. sol.) | 9.05 | 50 |

*polyphosphoric acid

Application Examples

I Dispersing China Clay

For use in the dispersing test the pH was adjusted to 7-9 by addition of a 50% by weight aqueous solution of sodium hydroxide.

To a fine dispersion of 0.30 g of China Clay (Imerys, Cornwall, UK) in 300 ml deionised water (pH 7.5, 400 ml glass beaker (diameter: 8,0 cm, with marks) 44 mg of calcium chloride monohydrate and 95 mg of a linear $C_{12}$-alkylbenzene sulfonate (LAS) are added with stirring at room temperature. Then 10 ppm, based on the dispersion, of the polymer to be tested is added and stirring is continued for 10 min. Then the stirrer is stopped. After 20 min. and 50 min a sample is taken with a pipet at a defined height of the beaker (175 ml mark). The sample is immediately transferred into a cuvette (1 cm) and the extinction at 600 nm is determined in a photometer. The higher the extinction the better is the dispersing action. The results are given in table 6.

TABLE 6

| 0-value of the dispersion 1.35 | extinction after 20 min | extinction after 50 min |
|---|---|---|
| without polymer | 0.50 | 0.35 |
| Polymer D 3 | 1.47 | 1.41 |
| Polymer D 4 | 1.37 | 0.97 |
| Polymer D 7 | 0.82 | 0.54 |
| Polymer E 3 | 1.39 | 1.20 |
| Polymer E 5 | 1.03 | 0.77 |
| Polymer E 6 | 1.24 | 0.58 |

II Secondary Detergency

To determine the secondary detergency, the graying of the white test fabric was measured by determining the degree of whiteness before and after washing using a Datacolor photometer (Elrepho® 2000) by reference to the reflectance (%). The greater the drop in the degree of whiteness, the greater the graying of the fabric, and vice versa. The washing conditions are listed in table 7.

TABLE 7

| Washing conditions | |
|---|---|
| Device | Launder-o-meter from Atlas, Chicago, USA |
| Washing liquor | 250 ml |
| Washing time | 30 min at 40° C. |
| Detergent | 300 ppm linear $C_{12}$-alkylbenzenesulfonate |
| Water hardness | 1 mmol/l Ca:Mg:HCO$_3$ 4:1:8 |
| Fabric/liquor ratio | 1:12.5 |
| Washing cycles | 1 |
| Polymer addition | 100 ppm |
| Test fabric | 2 × 5.0 g of cotton fabric 221 (bleached, weight per unit area 132 g/m$^2$) |
| Soiled fabric | 10 g of cotton fabric 290 (twill ware, bleached, weight per unit area 193 g/m$^2$), soiled with a 1:1:1 mixture of 3 types of clay (Na/Al silicate proportion of the soiled textile 4.53% by weight; initial reflectance 17.3%) |
| Types of clay | Niederahr red-burning clay 178/RI Hessian brown-burning manganese clay 262 Yellow-burning clay 158/G all from Jager KG, Hilgert, Germany |

The results obtained are summarized in table 8.

TABLE 8

| | Cotton 221 Reflectance in % |
|---|---|
| Unwashed | 83.2 |
| without | 48.3 |
| 100 ppm polymer D 3 | 57.2 |
| 100 ppm polymer D 4 | 53.6 |

TABLE 8-continued

|  | Cotton 221 Reflectance in % |
|---|---|
| 100 ppm polymer D 5 | 55.1 |
| 100 ppm polymer D 7 | 54.7 |
| 100 ppm polymer E 1 | 53.4 |
| 100 ppm polymer E 4 | 54.1 |
| 100 ppm polymer E 5 | 57.4 |
| 100 ppm polymer E 6 | 55.7 |

The invention claimed is:

1. A modified polyaminoamide, wherein at least a part of the amino nitrogens of the modified polyaminoamide carry both
(a) a radical R selected from the group consisting of $C_1$-$C_6$-alkyl, $C_6$-$C_{16}$-aryl-$C_1$-$C_4$-alkyl, and a group Alk-O-A, wherein
A is hydrogen or an acidic group selected from $B^1$—PO(OH)$_2$, $B^1$—S(O)$_2$OH and $B^2$—COOH which may be present in an acidic or anionic form, wherein $B^1$ is a single bond or $C_1$-$C_6$-alkanediyl, and $B^2$ is $C_1$-$C_6$-alkanediyl, and
Alk is $C_2$-$C_6$-alkane-1,2-diyl,
and
(b) a moiety of the formula I

—$(CH_2$—$CR^1R^2$—O-$)_p$A        I, wherein
A is as defined above,
$R^1$ is independently selected from the group consisting of hydrogen, $C_1$-$C_{12}$-alkyl, $C_2$-$C_8$-alkenyl, $C_6$-$C_{16}$-aryl, and $C_6$-$C_{16}$-aryl-$C_1$-$C_4$-alkyl,
$R^2$ is independently selected from hydrogen and methyl, and
P is an integer provided that p has a number average of at least 10,
wherein the modified polyaminoamide comprises repeating units of the formula II

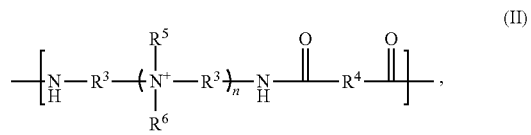        (II)

wherein n is an integer from 1 to 20,
$R^3$ are independently from one another $C_2$-$C_8$-alkanediyl,
$R^4$ is a chemical bond linking two adjacent carbonyl groups or a bivalent organic radical,
$R^5$ is hydrogen, the radical R as defined above or a side chain of the formula I, and
$R^6$ may be an electron pair or is a radical selected from hydrogen, the radical R as defined above, and a side chain of the formula I,
provided that at least a part of the moieties

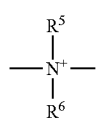

carry both the side chain of the formula I and the radical R as the radicals $R^5$ and $R^6$.

2. The modified polyaminoamide as claimed in claim 1, wherein the group A is hydrogen.

3. The modified polyaminoamide as claimed in claim 1, wherein at least 25% of the side chains of the formula I and of the groups Alk-O-A, if present, carry the acidic group A.

4. The modified polyaminoamide as claimed in claim 3, wherein at least 50% of the side chains of the formula I and of the groups Alk-O-A, if present, carry the acidic group A.

5. The modified polyaminoamide as claimed in claim 1, wherein at least 50% of the amino nitrogens in the modified polyaminoamide carry both the radical R and a side chain of the formula I.

6. The modified polyaminoamide as claimed in claim 1, wherein the number average of p is from 15 to 70.

7. The modified polyaminoamide as claimed in claim 6, wherein the number average of p is from 21 to 50.

8. The modified polyaminoamide as claimed in claim 1, wherein $R^1$ is hydrogen or methyl and $R^2$ is hydrogen.

9. The modified polyaminoamide as claimed in claim 1, wherein
n is an integer from 1, 2 or 3,
$R^3$ is 1,2-ethandiyl or 1,3-propandiyl, and
$R^4$ is $C_2$-$C_8$-alkanediyl.

10. The modified polyaminoamide as claimed in claim 9, wherein the modified polyaminoamide is obtained by a condensation reaction of a dicarboxylic acid of the formula IV

HOOC—$R^4$—COOH        (IV), wherein $R^4$ is a chemical bond linking two adjacent carbonyl groups or a divalent organic radical,
with a polyalkylenpoly amine of the formula V $H_2N$—$R^3$—(NH—$R^3$)$_n$—$NH_2$        (V), wherein n is an integer from 1 to 500, $R^3$ is $C_2$-$C_8$-alkanediyl,
and, optionally, with an aliphatic, aromatic or cycloaliphatic diamine of the formula VI $NH_2$—$R^7$—$NH_2$        (VI), wherein $R^7$ is a bivalent organic radical having from 1 to 20 carbon atoms and, optionally, comprising from 1 to 6 heteroatoms.

11. The modified polyaminoamide as claimed in claim 10, wherein the molar ratio of the dicarboxylic acid to the total amount of the polyalkylenepolyamine of the formula V and the diamine of the formula VI is from 2:1 to 1:2.

12. The modified polyaminoamide as claimed in claim 10, wherein $R^7$ is selected from the group consisting of $C_1$-$C_{20}$-alkanediyl which may be interrupted by 1, 2, 3 or 4 heteroatoms selected from O and S and which may contain 1 or 2 C=C-double bonds, and which may have one or more hydroxyl groups; 1,4-diaminocylohexane; bis-(4-aminocyclohexyl)methane; 4,4'-diaminodiphenylmethane; and 1,4-bis-(3-aminopropyl)piperazine.

13. The modified polyaminoamide as claimed in claim 10, wherein $R^4$ is a bivalent organic radical.

14. The modified polyaminoamide as claimed in claim 1, which is obtained by a process comprising:
i) reacting a non-modified polyaminoamide with at least 10 moles per mol of amino bound hydrogen atoms in the non-modified polyaminoamide of at least one oxirane of the formula III

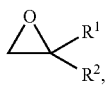

(III)

wherein $R^1$ and $R^2$ are as defined in claim 1;
whereby a modified polyaminoamide is obtained, wherein at least a part of the amino nitrogen atoms carry a side chain of the formula I with the group A being hydrogen;

ii) reacting the modified polyaminoamide of i) with at least one alkylating compound selected from the group consisting of the compounds of the formula R-X, wherein R is as defined in claims 1 and X is selected from the group consisting of halogen, sulfate, alkylsulfonate, arylsulfonate, and alkylsulfate, and $C_2$-$C_6$-alkylene oxides, thereby obtaining a cationically modified polyaminoamide having hydroxyl groups; and iii) optionally, esterifying the hydroxyl groups in the cationically modified polyaminamide obtained in ii) with sulfuric acid or phosphoric acid or with an ester-forming derivative thereof, or etherifying the hydroxyl groups in the cationically modified polyaminamide obtained in ii) with a compound of the formula L-$B^3$-A', wherein A' is selected from COOH, $SO_3H$, and $PO(OH)_2$, $B^3$ is $C_1$-$C_6$-alkandiyl, and L is a leaving group, which can be replaced by nucleophiles.

15. A method of making the modified polyaminoamide as claimed in claim 14, the method comprises:

i) reacting a non-modified polyaminoamide with at least 10 moles per mol of amino bound hydrogen atoms in the non-modified polyaminoamide of at least one oxirane of the formula III

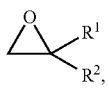

(III)

wherein $R^1$ and $R^2$ are as defined in claim 11;
whereby a modified polyaminoamide is obtained, wherein at least a part of the amino nitrogen atoms carry a side chain of the formula I with the group A being hydrogen;

ii) reacting the modified polyaminoamide of i) with at least one alkylating compound selected from the group consisting of the compounds of the formula R—X, wherein R is as defined in claim 11 and X is selected from the group consisting of halogen, sulfate, alkylsulfonate, arylsulfonate, and alkylsulfate, and $C_2$-$C_6$-alkylene oxides, thereby obtaining a cationically modified polyaminoamide having hydroxyl groups; and iii) optionally, esterifying the hydroxyl groups in the cationically modified polyaminamide obtained in ii) with sulfuric acid or phosphoric acid or with an ester-forming derivative thereof, or etherifying the hydroxyl groups in the cationically modified polyaminamide obtained in ii) with a compound of the formula L-$B^3$-A', wherein A' is selected from COOH, $SO_3H$ and $PO(OH)_2$, B3 is $C_1$-$C_6$-alkandiyl and L is a leaving group, which can be replaced by nucleophiles or L-B form together an alkyl radical having from 2 to 6 carbon atoms and carrying an oxirane moiety.

16. A method of preparing a dispersion of fine particulate solids, the method comprising adding the modified polyaminoamide according to claim 1 as a dispersant to the fine particulate solids, thereby forming the dispersion.

17. An aqueous dispersion of pigments comprising an effective amount of at least one modified polyaminoamide as claimed in claim 1.

18. The modified polyaminoamide as claimed in claim 1, wherein $R^4$ is a bivalent organic radical.

19. The modified polyaminoamide as claimed in claim 1, wherein at least 50% of the side chains of the formula I and of the groups Alk-O-A, if present, carry the acidic group A, and the number average of p is from 15 to 70.

20. The modified polyaminoamide as claimed in claim 1, wherein at least 50% of the side chains of the formula I and of the groups Alk-O-A, if present, carry the acidic group A, and the number average of p is from 21 to 50.

21. A modified polyaminoamide, wherein at least a part of the amino nitrogens of the modified polyaminoamide carry both (a) a radical R selected from the group consisting of $C_1$-$C_6$-alkyl, $C_6$-$C_{16}$-aryl-$C_1$-$C_4$- alkyl, and a group Alk-O-A, wherein A is hydrogen or an acidic group selected from $B^1$—PO$(OH)_2$, $B^1$—S(O)$_2$OH and $B^2$—COOH which may be present in an acidic or anionic form, wherein $B^1$ is a single bond or $C_1$-$C_6$-alkanediyl, and $B^2$ is $C_1$-$C_6$-alkanediyl, and Alk is $C_2$-$C_6$-alkane-1,2-diyl, and (b) a moiety of the formula I

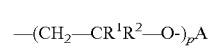  I, wherein

A is as defined above, $R^1$ is independently selected from the group consisting of hydrogen, $C_1$-$C_{12}$-alkyl, $C_2$-$C_8$-alkenyl, $C_6$-$C_{16}$-aryl, and $C_6$-$C_{16}$-aryl-$C_1$-$C_4$-alkyl, $R^2$ is independently selected from hydrogen and methyl, and p is an integer provided that p has a number average of at least 10, wherein at least 50% of the side chains of the formula I and of the groups Alk-O-A, if present, carry the acidic group A, and the number average of p is from 15 to 70.

22. A modified polyaminoamide, wherein at least a part of the amino nitrogens of the modified polyaminoamide carry both (a) a radical R selected from the group consisting of $C_1$-$C_6$-alkyl, $C_6$-$C_{16}$-aryl-$C_1$-$C_4$- alkyl, and a group Alk-O-A, wherein A is hydrogen or an acidic group selected from $B^1$—PO$(OH)_2$, $B^1$—S(O)$_2$OH and $B^2$—COOH which may be present in an acidic or anionic form, wherein $B^1$ is a single bond or $C_1$-$C_6$-alkanediyl, and $B^2$ is $C_1$-$C_6$-alkanediyl, and Alk is $C_2$-$C_6$-alkane-1,2-diyl, and (b) a moiety of the formula I

      I, wherein

A is as defined above, $R^1$ is independently selected from the group consisting of hydrogen, $C_1$-$C_{12}$-alkyl, $C_2$-$C_8$-alkenyl, $C_6$-$C_{16}$-aryl, and $C_6$-$C_{16}$-aryl-$C_1$-$C_4$-alkyl, $R^2$ is independently selected from hydrogen and methyl, and p is an integer provided that p has a number average of at least 10, wherein at least 50% of the side chains of the formula I and of the groups Alk-O-A, if present, carry the acidic group A, and the number average of p is from 21 to 50.

* * * * *